(12) United States Patent
Ahn et al.

(10) Patent No.: US 8,332,426 B2
(45) Date of Patent: Dec. 11, 2012

(54) INDENTIFYING REFERRING EXPRESSIONS FOR CONCEPTS

(75) Inventors: David Ahn, San Francisco, CA (US); Michael Paul Bieniosek, Woodinville, WA (US); Andrei Peter Makhanov, San Jose, CA (US); Franco Salvetti, San Francisco, CA (US); Giovanni Lorenzo Thione, San Francisco, CA (US); Gianluca Donato, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 90 days.

(21) Appl. No.: 12/953,166

(22) Filed: Nov. 23, 2010

(65) Prior Publication Data

US 2012/0131008 A1 May 24, 2012

(51) Int. Cl.
*G06F 7/00* (2006.01)
*G06F 17/30* (2006.01)

(52) U.S. Cl. ........................................ 707/771; 707/748
(58) Field of Classification Search .................. 707/771, 707/999.03, 748
See application file for complete search history.

(56) References Cited

U.S. PATENT DOCUMENTS

| | | | |
|---|---|---|---|
| 7,225,184 B2 | 5/2007 | Carrasco | |
| 7,260,571 B2 | 8/2007 | Amitay | |
| 7,548,910 B1 | 6/2009 | Chu | |
| 7,827,170 B1 * | 11/2010 | Horling et al. | 707/722 |
| 7,860,852 B2 * | 12/2010 | Brunner et al. | 707/706 |
| 8,122,016 B1 | 2/2012 | Lamba et al. | |
| 2002/0120609 A1 | 8/2002 | Lang | |
| 2005/0283468 A1 | 12/2005 | Kamvar | |
| 2006/0224580 A1 * | 10/2006 | Quiroga et al. | 707/5 |
| 2007/0118803 A1 | 5/2007 | Walker et al. | |
| 2008/0033982 A1 * | 2/2008 | Parikh et al. | 707/102 |
| 2008/0120276 A1 | 5/2008 | Chennavasin | |
| 2008/0133505 A1 | 6/2008 | Bayley | |
| 2008/0263038 A1 * | 10/2008 | Judge et al. | 707/6 |
| 2009/0222421 A1 | 9/2009 | Aoki et al. | |
| 2010/0031190 A1 * | 2/2010 | Hall et al. | 715/806 |
| 2010/0049708 A1 | 2/2010 | Kawai et al. | |
| 2010/0169316 A1 | 7/2010 | Gehlot | |
| 2012/0089598 A1 * | 4/2012 | Oztekin et al. | 707/723 |

OTHER PUBLICATIONS

Valle-Agudo, David Del, et al., UC3M_13: Disambiguation of Person Names Based on the Composition of Simple Bags of Typed Terms—Published Date: 2007 http://www.aclweb.org/anthology/S/S07/S07-1079.pdf.

Martins, Bruno, et al., Handling Locations in Search Engine Queries—Published Date: 2006 http://citeseerx.ist.psu.edu/viewdoc/download?doi=10.1.1.99.1073&rep=rep1&type=pdf.

(Continued)

*Primary Examiner* — Cam Truong
(74) *Attorney, Agent, or Firm* — Shook Hardy & Bacon LLP

(57) ABSTRACT

Referring expressions are identified for concepts by analyzing search query and result selection information. An ontology of concepts is identified, and at least one document is associated with each concept. The document associated with a concept is representative of the concept. Search query information from a search engine is analyzed to identify search queries that resulted in user selections of documents associated with the concepts. Referring expressions that refer to the concepts are identified based on the search queries that resulted in user selections of documents corresponding with the concepts. After identifying referring expressions for concepts, search queries may be mapped to referring expressions to identify concepts to which the search queries pertain, and search result pages may be generated based on knowledge of the concepts.

17 Claims, 7 Drawing Sheets

OTHER PUBLICATIONS

Bollegala, Danushka, et al., Extracting Key Phrases to Disambiguate Personal Name Queries in Web Search—Published Date: 2006 http://www.iba.t.u-tokyo.ac.jp/~danushka/papers/CLLIR.pdf.

Wan, Xiaojun, et al., Person Resolution in Person Search Results: WebHawk—Published Date: 2005 http://research.microsoft.com/en-us/um/people/jfgao/paper/cf440-wan.pdf.

P. Deepak, Context Disambiguation in Web Search Results—Published Date: 2003 http://citeseerx.ist.psu.edu/viewdoc/download?doi=10.1.1.105.4767&rep=rep1&type=pdf.

Sieg, Ahu, et al., Using Concept Hierarchies to Enhance User Queries in Web-based Information Retrieval—Published Date: 2004 http://citeseerx.ist.psu.edu/viewdoc/download?doi=10.1.1.90.4140&rep=rep1&type=pdf.

Bonino, Dario, et al., Ontology Driven Semantic Search—Published Date: 2004 http://www.wseas.us/e-library/conferences/venice2004/papers/472-334.pdf.

Hollink, Vera, et al., Semantic vs term-based query modification analysis—Published Date: 2010 http://homepages.cwi.nl/~media/publications/Hollink10DIR.pdf.

Gauch, Susan, et al., User Profiles for Personalized Information Access—Published Date: 2007 http://citeseer.uark.edu/publications1/user%20profiles.pdf.

Trajkova, Joana, et al., Improving Ontology-Based User Profiles—Published Date: 2004 http://citeseer.uark.edu/publications/RIAO2004.pdf.

Non-Final Office Action in U.S. Appl. No. 12/953,139, mailed Apr. 5, 2012.

* cited by examiner

INDENTIFYING REFERRING EXPRESSIONS FOR CONCEPTS

CROSS-REFERENCE TO RELATED APPLICATIONS

This application is related by subject matter to the invention disclosed in the following commonly assigned application filed on even date herewith: U.S. application Ser. No. 12/953,139, entitled "CONCEPT DISAMBIGUATION VIA SEARCH ENGINE SEARCH RESULTS." The aforementioned application is herein incorporated by reference in its entirety.

BACKGROUND

The amount of information and content available on the Internet continues to grow exponentially. Given the vast amount of information, search engines have been developed to facilitate searching for electronic documents. In particular, users may search for information and documents by entering search queries comprising one or more terms that may be of interest to the user. After receiving a search query from a user, a search engine identifies documents and/or web pages that are relevant based on the search query. Because of its utility, web searching, that is, the process of finding relevant web pages and documents for user issued search queries has arguably become the most popular service on the Internet today.

Many search queries are directed to particular entities or concepts, such as a particular person, place, or thing. When some search engines receive a search query from an end user, the search engines attempt to identify whether the search query refers to a particular concept. If so, the search engine may configure that search results returned to the end user based on the identified concept. However, there may be any number of different combinations of words with spelling and/or punctuation variations that may all refer to the same concept. For example, consider the king of the United Kingdom between George V and George VI. In the present-day, he is primarily referred to as "the Duke of Windsor" but he may also be referred to with "Edward" and "Edward Albert Christian George Andrew Patrick David" and "the former King Edward VIII" and "Edward A.C.G.P.D." and many other possible expressions.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to identifying the various referring expressions that may be used to refer to a concept and using that information when analyzing a search query to return a search results page. In accordance with embodiments, an ontology of concepts may be generated, and at least one document may be identified for each concept that is representative of that concept. Search query and results selection information is analyzed to identify each time a document corresponding with a concept is selected as a search result to a search query. A number of referring expressions may be identified for the concept based on the search queries submitted by end users that result in user selections of the document corresponding with the concept. After identifying referring expressions for concepts in the ontology, when a search query is received from an end user, the search query may be mapped to a referring expression and a concept corresponding with the referring expression may be identified. The concept may then be used to generate a search results page that is returned to the end user in response to the search query.

BRIEF DESCRIPTION OF THE DRAWINGS

The present invention is described in detail below with reference to the attached drawing figures, wherein.

DETAILED DESCRIPTION

Figure 1:
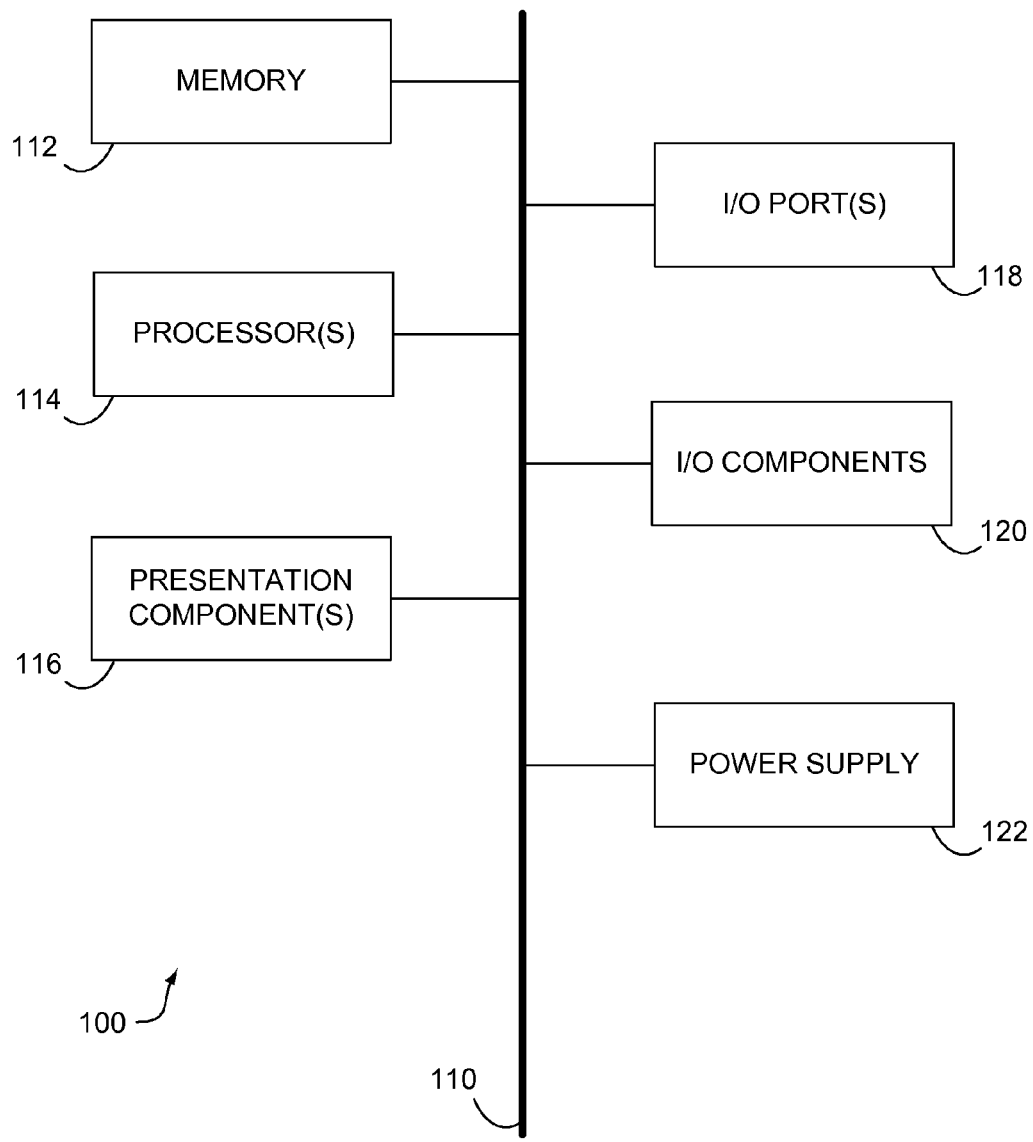
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide for, among other things, identifying a number of referring expressions that refer to a particular concept. As used herein, a "concept" refers to any unique entity or topic that may be subject of description in a document. For instance, a concept may include a person, place, thing, or event. As used herein, a "referring expression" is one or more words that refer to a particular concept. A referring expression may act as a trigger to identify a concept as the subject of a search query containing the referring expression.

In accordance with embodiments of the present invention, an ontology of concepts is identified. The ontology of concepts may be manually generated by search personnel or automatically generated, for instance, from an existing collection of documents. At least one document is associated with each of the concepts. The document associated with a given concept is unique to and representative of the concept.

Referring expressions for concepts are identified by analyzing search query and results selection information in conjunction with knowledge of the documents associated with each concept in the ontology of concepts. Generally, search queries that result in user selections of documents corresponding with the concepts in the ontology may be identified and used to determine the referring expressions for the various concepts.

Identifying referring expressions for concepts may be useful when processing search queries from end users. When an end user submits a search query, the search query may be analyzed to determine if it contains text corresponding with a referring expression. If so, the concept to which the referring expression refers is identified. The concept may then be used to generate a search results page that is returned in response to the search query.

In some instances, a single referring expression may be determined to refer to multiple concepts. In such cases, additional techniques may be employed to perform concept disambiguation to determine which concept the referring expression should refer.

Accordingly, in one aspect, an embodiment of the present invention is directed to one or more computer storage media storing computer-useable instructions that, when used by a computing device, cause the computing device to perform a method. The method includes identifying a first concept from an ontology of concepts and identifying a first document corresponding with the first concept. The method also includes analyzing search query information to identify search queries that resulted in user selections of the first document. The method further includes identifying a plurality of referring expressions that refer to the first concept based on the search queries that resulted in user selections of the first document.

In another embodiment, an aspect of the present invention is directed to a method for identifying referring expressions that refer to a concept. The method includes identifying a first concept from an ontology of concepts and identifying a first document corresponding with the first concept. The method also includes generating a plurality of candidate expressions for the first concept. The method further includes analyzing search query information to identify search queries that resulted in user selections of the first document. The method also includes mapping at least a portion of the search queries that resulted in a user selection of the first document to one of the plurality of candidate expressions. The method further includes generating a score for each candidate expression based on the number of search queries that resulted in a user selection of the first document that map to each candidate expression. The method also includes selecting referring expressions for the concept based on the score associated with each candidate expression. The method further includes receiving a search query from an end user, determining that the search query corresponds with a first referring expression from the referring expressions for the concept, and determining that the search query corresponds with the first concept based on determining that the search query corresponds with the first referring expression. The method still further includes generating a search results page using the first concept, and providing the search results page for presentation to the end user in response to the search query.

A further embodiment of the present invention is directed to a system including at least one processor and at least one computer storage medium storing a plurality of components. The components include a monitoring component, an expression identification component, a query concept component, and a user interface component. The monitoring component monitors search queries and user search result selections of documents corresponding with concepts from an ontology of concepts. The expression identification component identifies referring expressions for each concept from the ontology of concepts based on search queries that results in user search result selections of at least one document corresponding with each concept. The query concept component operates to identify referring expressions corresponding with search terms of search queries, and also identifies concepts corresponding with the referring expressions. The user interface component that provides search results pages generated based on concepts identified for search queries.

Having described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other storage medium which can be used to store the desired information and which can be accessed by computing device 100.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
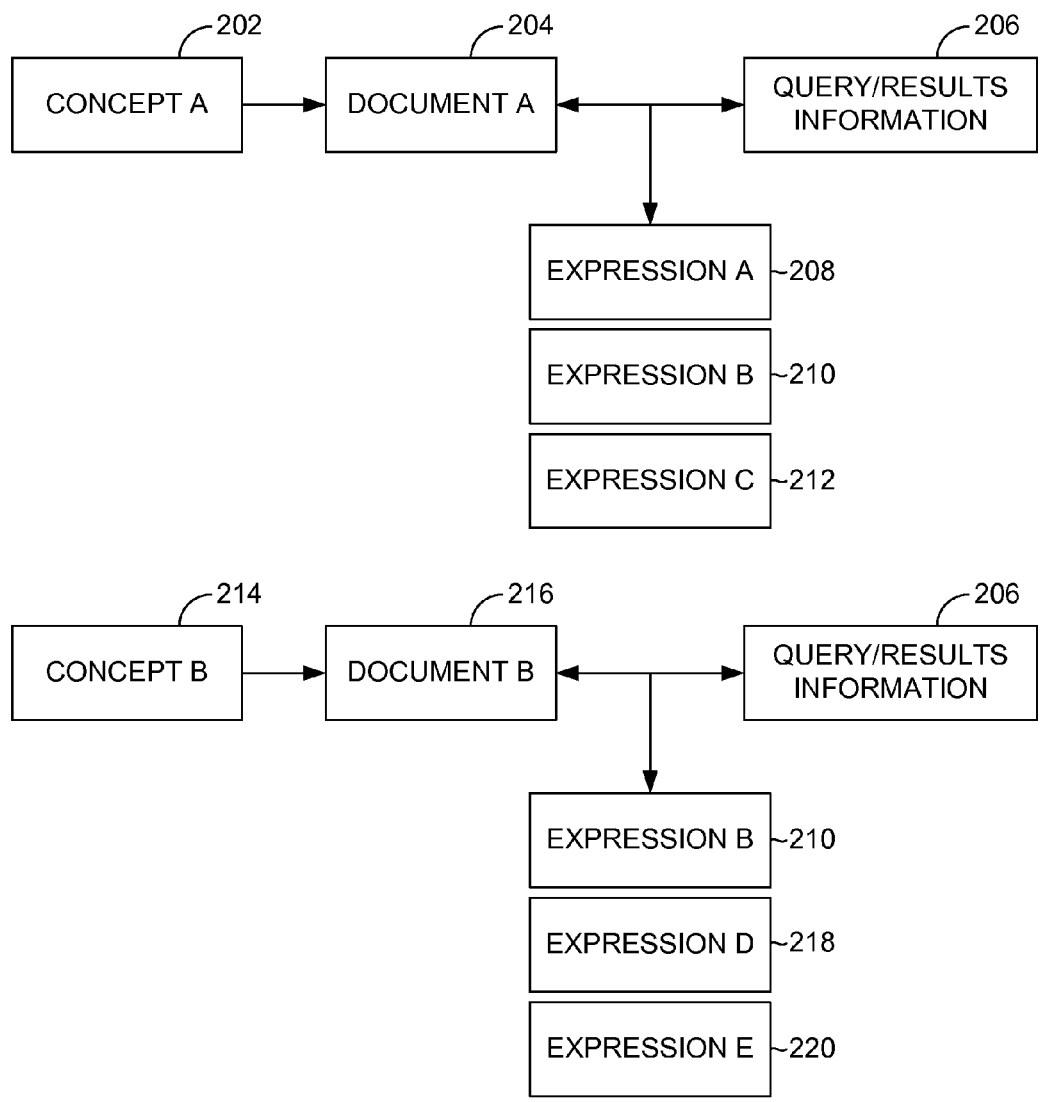
FIG. 2 is a diagram illustrating using search query and results selection information for identifying referring expressions for concepts in accordance with an embodiment of the present invention.

Turning to FIG. 2, a diagram is provided that illustrates identifying referring expressions that correspond with concepts in an ontology in accordance with an embodiment of the present invention. In accordance with embodiments of the present invention, an ontology of concepts is identified. FIG. 2 provides an example showing two concepts (concept A 202 and concept B 214) from an ontology that may include any number of concepts. Additionally, documents are associated with the concepts in the ontology. For instance, document A 204 is associated with concept A 202, and document B 216 is associated with concept B 214. Although FIG. 2 illustrates only a single document with each concept, any number of documents may be associated with each concept. The document(s) associated with a given concept may be unique to that concept and representative of the concept. For instance, one concept in the ontology may be Michael Jordan and a document providing a biography of Michael Jordan may be associated with that concept. In some embodiments, the documents may be electronic documents accessible via the web and indexed by a search engine.

In various embodiments of the present invention, the concepts in the ontology and the associated documents may be manually and/or automatically identified. For instance, in some embodiments, search system personnel may manually identify the concepts for the ontology and also manually identify and associate documents with the concepts.

In other embodiments, the ontology may be automatically generated based on an existing corpus of documents. By way of example only and not limitation, the ontology may be generated from documents in electronic encyclopedias (such as the WIKIPEDIA and BRITANICA encyclopedias), product shopping sites (such as the AMAZON product shopping site) or other databases, such as the IMDB and YELP databases. Each of these sources provide a collection of documents in which each document is directed to a particular concept (e.g., person, place, thing, etc.). Each document has a title and textual content. In embodiments, the document titles may be taken as the concepts for the ontology and the documents are associated with each corresponding concept. While in some embodiments, the title of the documents from an existing collection of documents may be used to identify concepts, in other embodiments, the documents may be mapped (manually or automatically) to an already existing concept in an ontology.

Although a single corpus of documents may be used to generate an ontology and/or associate documents with concepts, in other embodiments, multiple document corpuses may be employed. This may include mapping documents from two or more document corpuses to concepts in an ontology and using the documents from the various corpuses to represent the concepts. For example, an ontology of concepts could be created by employing documents from both the WIKIPEDIA and BRITANICA encyclopedias. Linking may be employed to identify documents from different sources as being directed to the same concept in the ontology. Linking may be identified in a number of different manners. In some instances, hyperlinks may be included within documents in one source that link to documents in another source. In other instances, an external database may link documents to a given concept. For instance, the FREEBASE database identifies documents from various sources as being related to given topics. In further cases, linking between documents from different sources may be implicitly identified by analyzing information such as the title of the documents or the content of the documents. Any and all such variations are contemplated to be within the scope of embodiments of the present invention.

In accordance with embodiments of the present invention, one or more referring expressions may be identified for each concept by analyzing user behavior on a commercial web search engine. Generally, embodiments of the present invention may monitor search queries submitted by ends users to a search engine and the search results selected by users in response to the search queries. The monitored search query and selected search results information may be compared against documents associated with concepts to generate referring expressions that refer to the concepts. In particular, search queries that resulted in user selections of a document associated with a particular concept may be used to identify referring expressions for that concept. As previously indicated, a referring expression is one or more words that may be interpreted as referring to a given concept. In some embodiments, a click score is generated for an expression/concept pair based on the number of user selections (i.e., "clicks") of a document corresponding with a concept in search queries that map to a given referring expression. If the click score exceeds a particular threshold for a candidate expression and concept pair, the candidate expression is considered to be a referring expression for the concept.

The identification of referring expressions for concepts is illustrated in FIG. 2. In particular, search query and selected search results information 206 may be analyzed to identify search queries that resulted in user selections of search results corresponding with document A 204. Based on this analysis, the search queries that resulted in user selections of search results corresponding with document A 204 may be used to identify a number of referring expressions for concept A 202: expression A 208, expression B 210, and expression C 212. As also shown in FIG. 2, the search query and selected search results information 206 may also be analyzed to identify search queries that resulted in user selections of search results corresponding with document B 216. Based on this analysis, the search queries that resulted in user selections of search results corresponding with document B 216 may be used to identify a number of referring expressions for concept B 214: expression B 210, expression D 218, and expression E 220.

As shown in FIG. 2, a number of different referring expressions may be identified as referring to a single concept. This is useful when receiving search queries and identifying a concept to which the search queries refer. In particular, end users often submit different variations of words and phrases when referring to particular concept. As such, embodiments of the present invention allow for the identification of various referring expressions that refer to a single concept. When a user submits a search query to a search engine, the search query may be compared against the various referring expressions identified for the various concepts in the ontology maintained by the search engine. From the comparison, a referring expression may be selected as corresponding with the search query, and a concept to which that referring expression refers may be identified as a concept for the search query.

Identifying a concept for a search query may facilitate providing a search results page in response to the user's search query. For instance, in some embodiments, an "instant answer" may be provided on the search results page in addition to web document search results identified for the search query. In contrast to a web document search result, an instant answer may not be a web document crawled and indexed by the search engine. Instead, the instant answer may be information that is presented on the search engine results page relevant to the concept identified in the search query. By way of example only and not limitation, an instant answer may be a profile view that provides a summary or overview of important information regarding the entity. For instance, if the search query is directed to a particular person, the profile view may provide a summary of information regarding that person. As another example, an instant answer may be an answer to a specific question submitted as a search query. For instance, a user may submit the query "height of eiffel tower," and the instant answer would indicate the height.

In some instances, a single referring expression may be identified as referring to two or more concepts. For instance, the referring expression "apple" may be identified as referring to both of the following concepts: the fruit and the Apple company. This is illustrated in FIG. 2 in which expression B 210 has been identified for both concept A 202 and concept B 214.

Further embodiments of the present invention are directed to addressing situations in which a single referring expression refers to multiple concepts. In some embodiments, when a search query is submitted that is mapped to a referring expression corresponding with multiple concepts, a disambiguation page that lists the multiple concepts may be provided to the end user to allow the end user to select the concept. The disambiguation page may include search results for the search query, or the disambiguation page may simply indicate the concepts and search results may be provided after the end user selects a concept.

In some embodiments, the search engine may automatically perform concept disambiguation to select a concept for a referring expression that refers to multiple concepts. For instance, in one embodiment, the click scores associated with expression/concept pairs may be used for concept disambiguation purposes. In particular, the click score is derived from the number of times ends users selected a document corresponding with a given concept for a particular search query. If search queries corresponding with a given referring expression resulted in more clicks for one concept than other concepts, the referring expression's click score for that concept will be higher than the referring expression's click score for the other concepts. Based on this, it may be determined that the concept with the highest click score has the strongest relationship with the referring expression and may be selected as the concept for the referring expression.

Another approach for concept disambiguation would be to use the search results obtained when performing a search using a search query corresponding with a referring expression. In particular, a search may be performed using a search query corresponding with a referring expression to obtain a set of search results. The search results may be compared with the documents associated with the concepts to identify which concept has the strongest relationship with the search results. The concept with the strongest relationship may be selected as the concept for the referring expression.

Still another approach for determining a concept for a referring expression that refers to multiple expressions would be to employ attribute information from the concepts. In particular, the search query received from an end user may be analyzed to determine if the search query contains an attribute in addition to a concept. As used herein, an "attribute" refers to an aspect, feature, or characteristic of a concept. For instance, attributes for a person may be characteristics such as birthday, age, height, weight, etc. If a search query is received that contains an attribute in addition to a concept, the attribute may be used by the search engine for concept disambiguation purposes. In particular, if only a single concept contains that attribute, that concept may be selected. For instance, suppose a user submits a search query "director of titanic." The search engine may identify the referring expression as "titanic" which may refer to two concepts—the boat (the RMS Titanic), and the movie ("Titanic"). Additionally, the search engine may identify "director" in the search query as an attribute and may determine that the movie "Titanic" is the only concept that has director as an attribute. As such, the search engine may select the movie "Titanic" as the concept for the search query.

Figure 3:
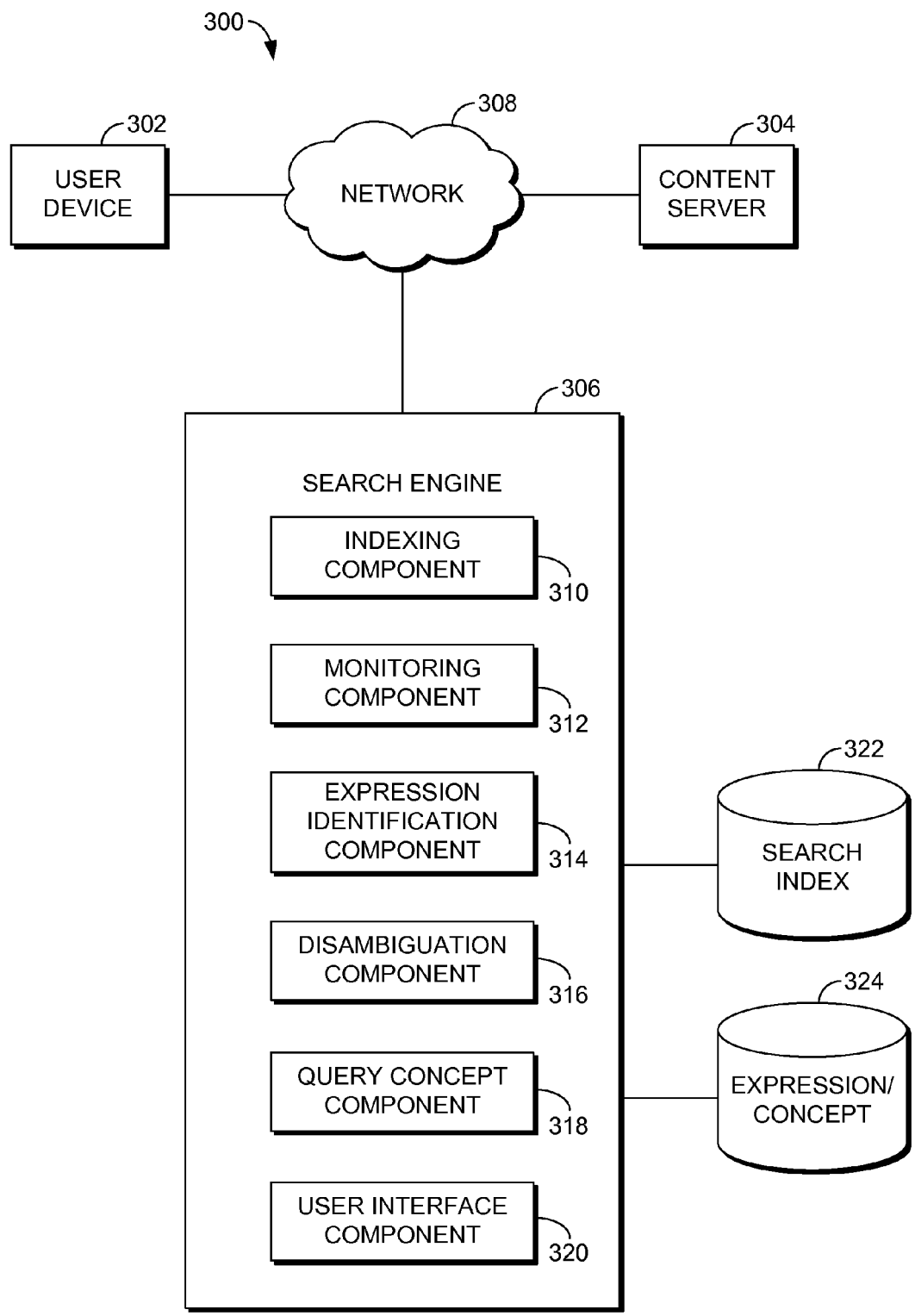
FIG. 3 is a block diagram of an exemplary system in which embodiments of the present invention may be employed.

Referring next to FIG. 3, a block diagram is provided illustrating an exemplary system 300 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software.

For instance, various functions may be carried out by a processor executing instructions stored in memory.

Among other components not shown, the system 300 may include a user device 302, content server 304, and search engine server 306. Each of the components shown in FIG. 3 may be any type of computing device, such as computing device 100 described with reference to FIG. 1, for example. The components may communicate with each other via a network 308, which may include, without limitation, one or more local area networks (LANs) and/or wide area networks (WANs). Such networking environments are commonplace in offices, enterprise-wide computer networks, intranets, and the Internet. It should be understood that any number of user devices, content servers, and search engine servers may be employed within the system 300 within the scope of the present invention. Each may comprise a single device or multiple devices cooperating in a distributed environment. For instance, the search engine server 306 may comprise multiple devices arranged in a distributed environment that collectively provide the functionality of the search engine server 306 described herein. Additionally, other components not shown may also be included within the system 300.

In the embodiment shown in FIG. 3, the search engine server 306 includes, among other things, an indexing component 310, a monitoring component 312, an expression identification component 314, a disambiguation component 316, a query concept component 318, and a user interface component 320.

The search engine server 306 generally operates to receive search queries from user devices, such as the user device 302, and to provide search results in response to the search queries. The user interface component 320 provides an interface to user devices, such as the user device 302, that allows users to submit search queries to the search engine server 306 and to receive search results from the search engine server 306. The user device 302 may be any type of computing device employed by a user to submit search queries and receive search results. By way of example only and not limitation, the user device 302 may be a desktop computer, a laptop computer, a tablet computer, a mobile device, or other type of computing device. The user device 302 may include an application that allows a user to enter a search query and submit the search query to the search engine server 306 to retrieve search results. For instance, the user device 302 may include a web browser that includes a search input box or allows a user to access a search page to submit a search query. Other mechanisms for submitting search queries to search engines are contemplated to be within the scope of embodiments of the present invention.

In embodiments of the present invention, the search engine server 306 may be configured to identify referring expressions that refer to various concepts in an ontology. When search queries are received by the search engine server 306, the search queries may be identified as corresponding with particular referring expressions and corresponding concepts may be identified based on the referring expressions. Identifying concepts for search queries may be employed for a variety of purposes when providing search results to an end user in response to a search query. For instance, a concept identified from a search query may be employed to provide an "instant answer" on the search engine results page in addition to web page search results.

The indexing component 310 operates to index data regarding documents maintained by content servers, such as the content server 304. For instance, a crawling component (not shown) may be employed to crawl content servers and access information regarding documents maintained by the content servers. The indexing component 310 then indexes data regarding the crawled documents in the search index 322, which is employed to retrieve search results in response to search queries.

The monitoring component 312 is configured to monitor search results submit to the search engine and search results selected by users in response to the search queries. Additionally, the monitoring component 312 may identify search queries that resulted in user selections of documents corresponding with concepts from an ontology of concepts. As discussed previously, embodiments of the present invention include identifying an ontology of concepts and identifying at least one document for each concept that is representative of that concept.

In some embodiments, the ontology of concepts and/or the associated documents may be manually identified. In other embodiments, the concepts and/or associated documents may be automatically derived using an existing collection of documents. For instance, a content server, such as the content server 304, may store a collection of documents for an electronic encyclopedia. The search engine server 306 may access the collection of documents and employ the title of documents to derive the concepts of the ontology. Additionally, each document may be used to generate the concept signature for the concept corresponding with that document. In further embodiments, an ontology may already be in place, and the documents from the existing collection of document may be mapped to various concepts in the ontology. Those documents would then be used to generate concept signatures for the corresponding concepts. Because documents associated with the concepts may be electronic documents (e.g., web documents) maintained by content servers, such as the content server 304, the documents may also be indexed in the search index 322.

The expression identification component 314 operates to identify referring expressions for concepts in the ontology of concepts. Generally, the search queries that result in user selections of a document corresponding with a concept may be employed to determine the referring expressions that refer to that concept. Referring expressions for each concept may be stored in the expression/concept storage 324. As such, when a search query is received, the query concept component 318 operates by identifying a referring expression from the search query and using that identification to look up a concept to which the referring expression refers. The concept identified may then be used to generate a search results page that may be provided to the end user submitting the search query via the user interface component 320.

In some instances, a referring expression may be found to refer to multiple concepts. As such, the search engine server 306 includes a disambiguation component 316, which may employ a number of different techniques to determine which concept should correspond with a given referring expression.

Figure 4:
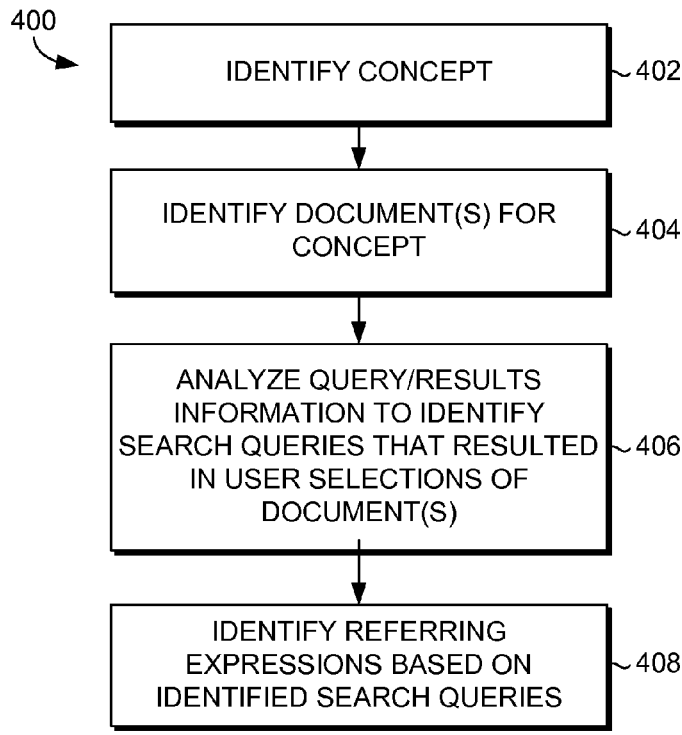
FIG. 4 is a flow diagram showing an overall method for identifying referring expressions for a concept in accordance with an embodiment of the present invention.

Turning to FIG. 4, a flow diagram is provided that illustrates a method 400 for identifying referring expressions for a concept in accordance with an embodiment of the present invention. Initially, as shown at block 402, a concept is identified. As discussed previously, an ontology containing a number of different concepts may be employed by embodiments of the present invention. In some embodiments, the ontology and various concepts may be manually identified. In other embodiments, the ontology and various concepts may be automatically generated from an existing collection of documents, for instance, by identifying the titles of the documents as concepts.

At least one document is identified for the concept, as shown at block 404. The document contains content that is unique to and representative of the concept. For instance, the concept may be Michael Jordan, and the document may be a biography of Michael Jordan. A document may be either manually or automatically identified for a concept. As an example of the latter, documents from an existing document corpus may be automatically mapped to concepts in the ontology.

In some embodiments, concepts may have a one-to-one relationship with documents such that a single concept may have only a single document corresponding with it. In other embodiments, concepts may have a one-to-many relationship with documents such that a single concept may have multiple documents corresponding with it. As such, the process at block 404 may include identifying multiple documents with a single concept. For instance, in some embodiments, multiple existing document corpuses may be employed to map documents to concepts. In such embodiments, documents from the various corpuses may all be directed to a single concept, and each of the documents may be associated with that concept.

Search query and search result selection information is used to identify referring expressions that refer to the concept identified at block 402. In particular, search queries are identified that resulted in user selections of the document(s) corresponding with the concept as shown at block 406. These search queries are used to select the referring expressions for the concept, as shown at block 408. In embodiments, candidate expressions are identified and a click score is generated for each candidate expression based on the number of times that search queries corresponding with a given candidate expression results in a click on the document(s) corresponding with the concept. Referring expressions for the concept may be determined based on the click scores from the candidate expressions. In some embodiments, candidate expressions having a click score greater than a predetermined threshold may be determined to be referring expressions for the concept.

While in some embodiment, any user selection of a document corresponding with the concept may be considered, in further embodiments, a number of factors may be taken in considering when determining whether a user action is sufficient to constitute a click and/or the factors may be used in weighting different user activities. By way of example, the factors may include the user dwell time—that is, the length of time the end user views the document after selecting a search result from the search results page. If the user only briefly views the document, it may be determined that the document did not satisfy the user's search. Other factors may include whether the end user returns back to the search results page and selects other documents, whether the user's search session ends after selecting the document, and whether the user refines the search after selecting the document. These factors may generally be indicative of whether the document satisfied the end user's search and therefore the document selection should be given some weight for the search query submitted by the end user. For instance, if the user refines the initial search, this indicates that the search engine results (including the selected document) did not satisfy the user's intent. This is in contrast to a situation in which the user initiates a completely different search, indicating that the intent was probably satisfied and the user is moving onto another search task. Whether a user refines an initial search could be determined, for instance, by some measure of similarity between the two search queries.

Figure 5:
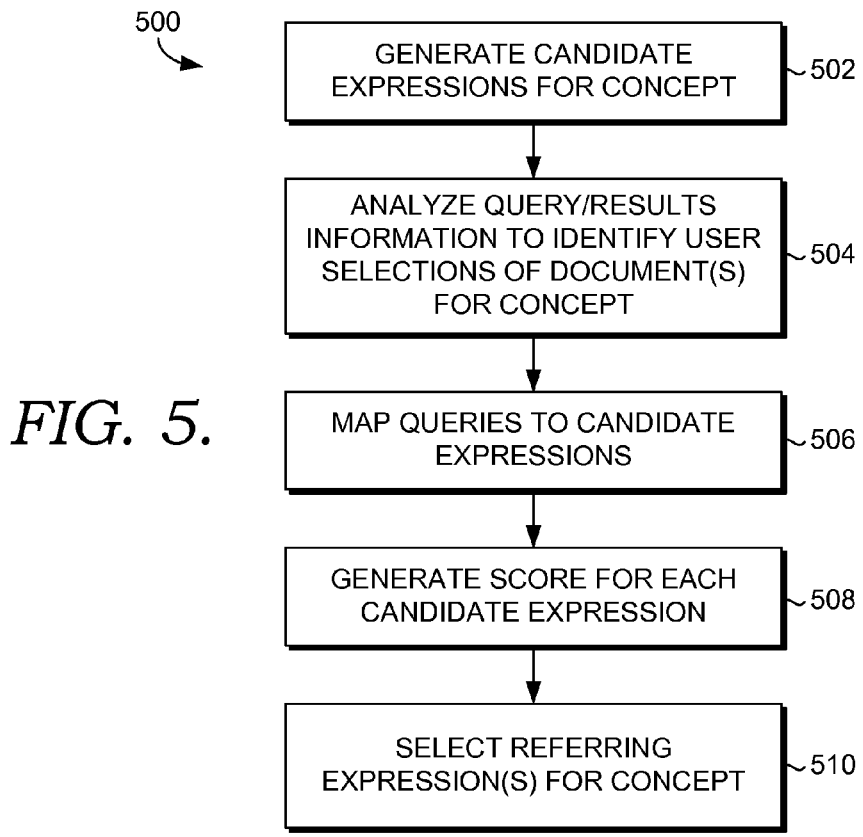
FIG. 5 is a flow diagram showing a method for generating candidate expressions for a concept and computing a click score to select candidate expressions as referring expressions for the concept in accordance with an embodiment of the present invention.

FIG. 5 provides a flow diagram that illustrates a method 500 for identifying candidate expressions for a concept and calculating click scores for the candidate expressions for selecting referring expressions in accordance with an embodiment of the present invention. As shown at block 502, candidate expressions are determined for a concept. Candidate expressions may be determined for a concept in a number of different ways in various embodiments of the present invention. In some embodiments, candidate expressions may be manually generated by search system personnel. In other embodiments, candidate expressions may be algorithmically generated based on the text of the document(s) corresponding with the concept. In further embodiments, candidate expressions may be derived from search queries that result in user selections of document(s) associated with the concept. In still further embodiments, candidate expression may be generated from aliases or alternate names suggested by titles or URL portions of documents in a document corpus that all refer to the same entity. For instance, redirects from the WIKIPEDIA encyclopedia may be used to generate candidate expressions. As a specific example, http://en.wikipedia.org/wiki/JFK redirects to http://en.wikipedia.org/John_F._Kennedy. This is a signal that "JFK" may be identified as a candidate expression for the concept "John F. Kennedy."

Search queries that result in user selections of the document(s) corresponding with the concept are identified at block 504. Each search query is mapped to a candidate expression, a shown at block 506. A search queries may be mapped to a candidate expression, for instance, by analyzing the edit distance between the search query and the candidate expression. Mapping a search query with a document click to a candidate expression contributes to the click score for the candidate expression. Accordingly, a click score is generated for each candidate expression based on the number of search queries that resulted in user selections of the concept's document(s) and that map to each candidate expression, as shown at block 508.

One or more referring expressions may be selected from the candidate expressions based on the click scores, as shown at block 510. In some embodiments, candidate expressions having a click score exceeding a threshold may be selected as the referring expressions for the concept.

As discussed previously, a referring expression may be determined to refer to two or more concepts in some instances. For example, the referring expression "apple" may refer to the fruit and the Apple company. Accordingly, some embodiments of the present invention are directed to disambiguating the concept(s) to which a given referring expression refers. This may include ranking the concepts for the referring expression and/or selecting a single concept as being associated with the referring expression. The disambiguation may be performed offline (i.e., before a search query is received from an end user) or online (i.e., after a search query is received from an end user).

Figure 6:
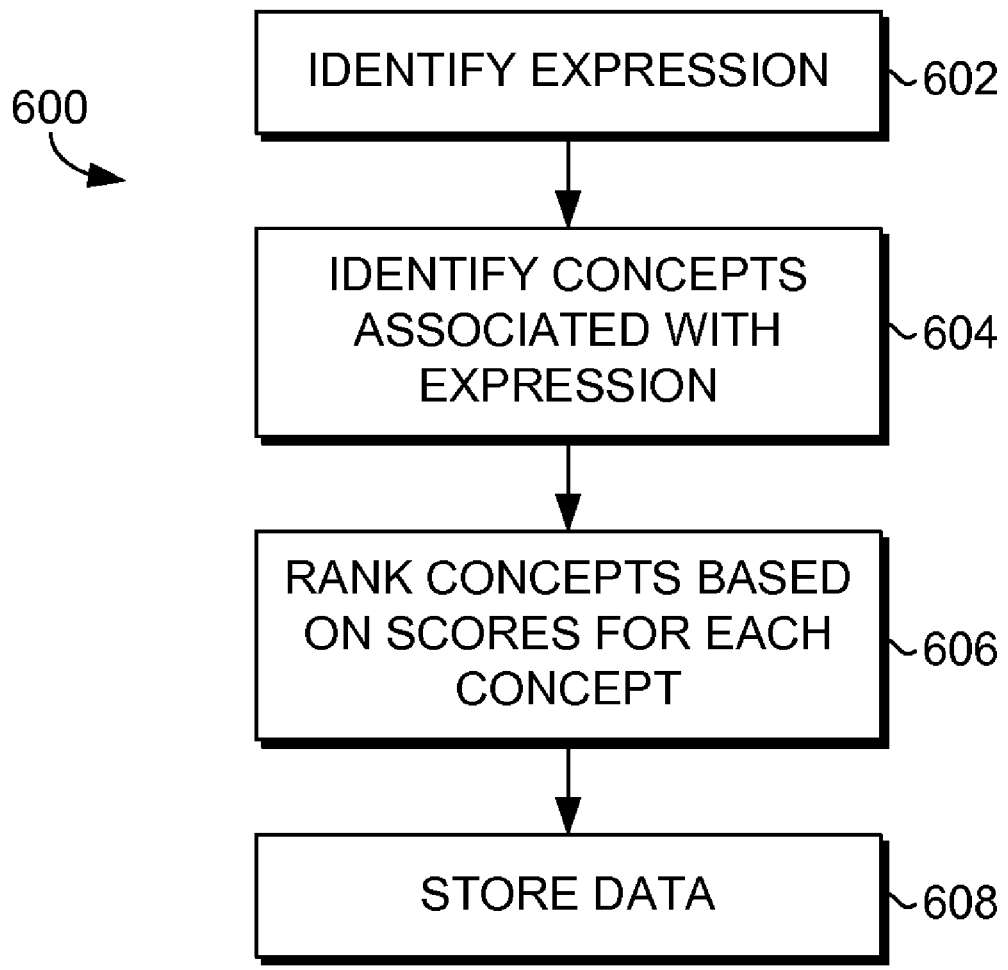
FIG. 6 is a flow diagram showing a method for disambiguating concepts for a referring expression in accordance with an embodiment of the present invention.

Concept disambiguation for a referring expression may be performed in a number of different manners in accordance with various embodiments of the present invention. By way of example, FIG. 6 illustrates a method 600 for providing concept disambiguation for a referring expression using click scores in accordance with one embodiment of the present invention. Initially, a referring expression that is associated with multiple concepts is identified, as shown at block 602. Additionally, the various concepts associated with the referring expression are identified, as shown at block 604.

The concepts are ranked for the referring expression based on the click scores determined for the referring expression for each concept, as shown at block 606. As described hereinabove, click scores are generated for referring expressions for concepts based on search queries corresponding with the referring expressions that result in user clicks on documents corresponding with the concepts. As such, the click scores may represent a strength of relationship between a referring expression and a concept. As such, concepts may be ranked based on the click score determined for the referring expression.

As shown at block 608, data may be stored identifying a referring expression and one or more concepts for the referring expression. In some embodiments, only the concept with the highest click score may be stored with the referring expression. In other embodiments, a number of concepts may be stored with the referring expression with an indication of rank or score for each concept that may be used for selecting a concept when a search query is received that maps to the referring expression.

Figure 7:
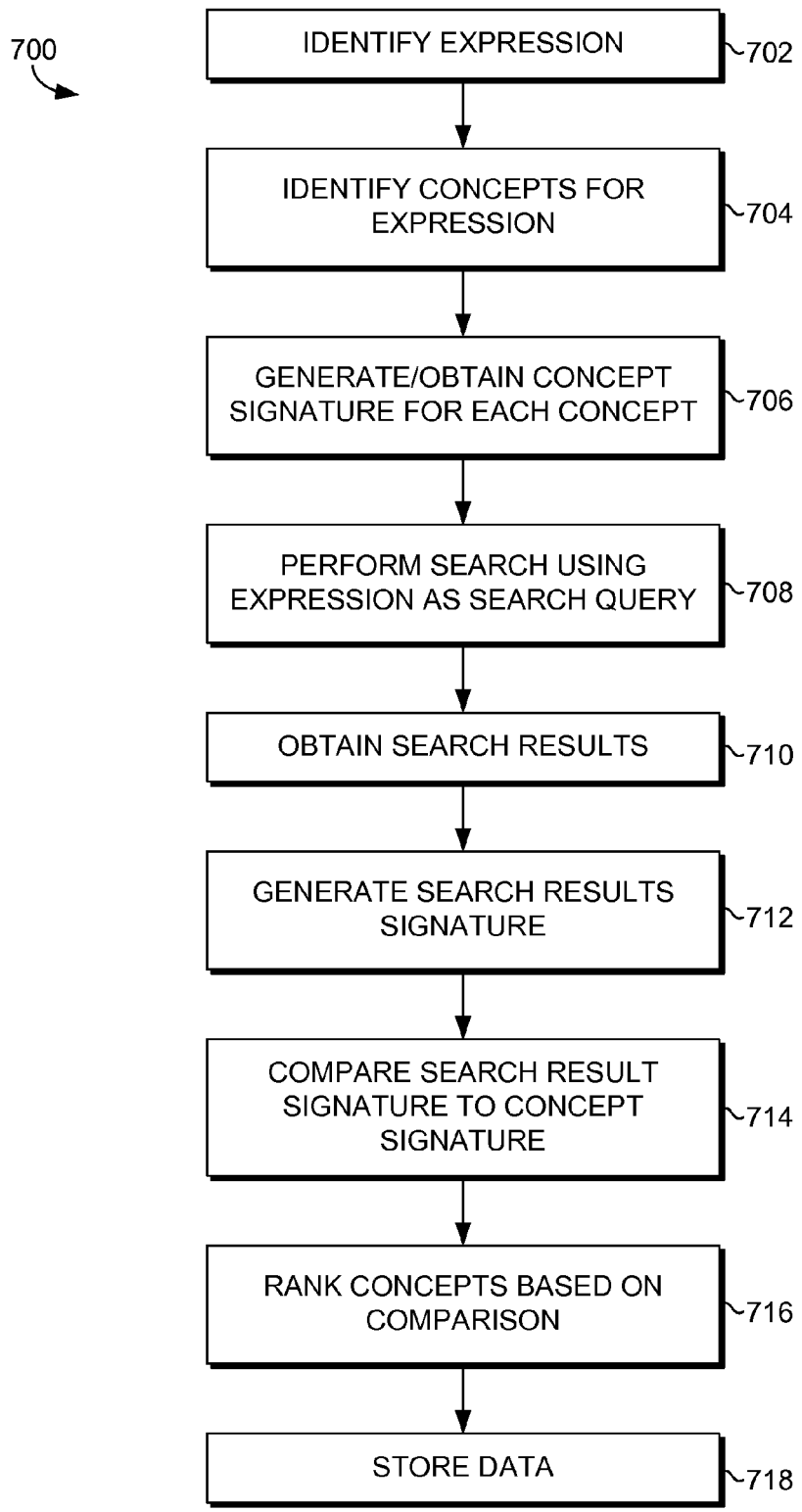
FIG. 7 is a flow diagram showing a method for disambiguating concepts for a referring expression in accordance with another embodiment of the present invention.

In another embodiment, concept disambiguation may be provided for a referring expression by analyzing search results provided when performing a search using the referring expression. FIG. 7 provides a flow chart that illustrates a method 700 for performing concept disambiguation using search results in accordance with an embodiment of the present invention. As shown at block 702, a referring expression that refers to multiple concepts is identified.

The various concepts associated with the referring expression are also identified, as shown at block 704. Additionally, a concept signature is generated for each concept, as shown at block 706. In some embodiments, the concept signature for a concept may include the document identifier for each document associated with the concept. In other embodiments, the concept signature for a concept may be generated as a function of the content of document(s) associated with the concept. By way of example only and not limitation, a concept signature may be a feature vector generated based on terms contained in the textual content of the document(s). In instances in which multiple documents are associated with a concept, either a single concept may be generated over the multiple documents or multiple content signatures may be generated for the concept, each content signature corresponding with a different document.

An offline search is performed by a commercial search engine using the referring expression as a search query, as shown at block 708. A set of search results are provided in response to the search, as shown at block 710. A search results signature is generated at block 712. In some embodiments, the search results signature may include document identifiers of documents corresponding with the search results. In other embodiments, the search results signature may be generated as a function of the content of documents corresponding with the search results.

The search result signature is compared with the concept signatures for the concepts corresponding with the referring expression, as shown at block 714. This comparison may include comparing the document identifiers from the concepts with the document identifiers from the search results. In other embodiments, this comparison may include computing a similarity measure between the search result signature and the concept signatures. Any number of similarity measures may be employed.

As a result of the comparison, the concepts may be ranked, as shown at block 716, based on the similarity of the search results to each concept. As shown at block 718, data may be stored identifying a referring expression and one or more concepts for the referring expression. In some embodiments, only the concept with the highest similarity determined by comparing the search results signature to the concept signatures may be stored with the referring expression. In other embodiments, a number of concepts may be stored with the referring expression with an indication of rank or similarity score for each concept that may be used for selecting a concept when a search query is received that maps to the referring expression.

Figure 8:
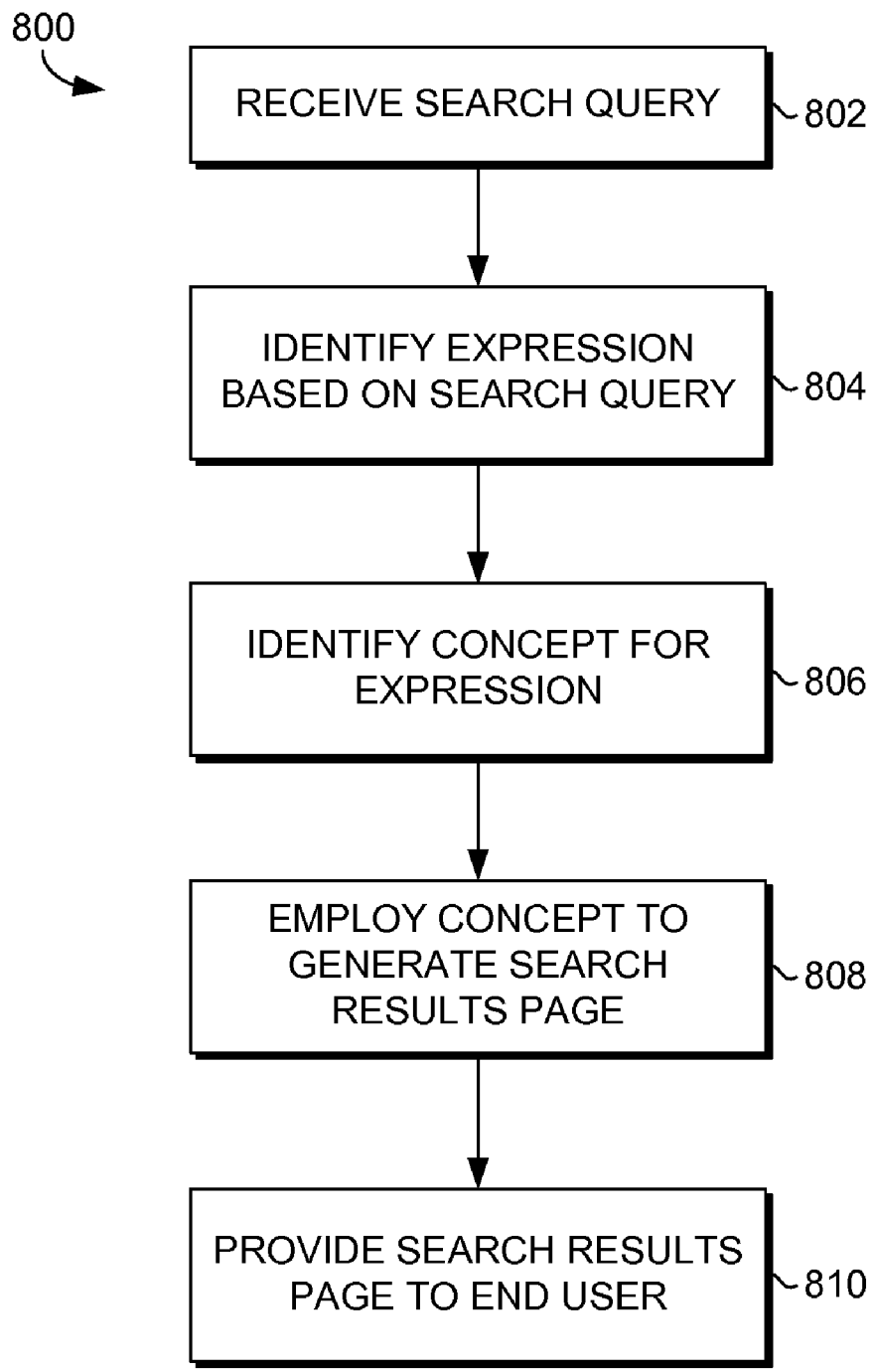
FIG. 8 is a flow diagram showing a method for processing a user search query to identify a concept and generate a search results page in accordance with an embodiment of the present invention.

Turning now to FIG. 8, a flow diagram is provided that illustrates a method for determining a concept for a search query and employing the concept to provide a search results page in accordance with an embodiment of the present invention. Initially, as shown at block 802, a search query is received from an end user. The search query is analyzed at block 804 to identify a referring expression that may be used to identify a concept for the search query. In embodiments, a data store may identify a number of referring expressions and concepts for the referring expressions. The referring expression may be identified at block 804, for instance, by determining the referring expression from the data store that has the shortest edit distance between the expression and the search query (or at least a portion of the search query). Other approaches for mapping a search query to a referring expression may be employed within embodiments of the present invention.

Once a referring expression has been identified, a concept is identified for the referring expression, as shown at block 806. In some embodiments, a referring expression may correspond with a single concept and that concept is identified at block 806. In other embodiments, a referring expression may correspond with multiple concepts. In some cases, a disambiguation process (such as those described above with reference to FIGS. 6 and 7) may have been performed offline that facilitates the selection of a concept for the referring expression. In other cases, a disambiguation process (similar to those described above with reference to FIGS. 6 and 7) may be performed online after the search query has been received to facilitate the selection of the concept for the referring expression. In further embodiments, additional techniques may be employed to disambiguate the concept for the referring expression. For instance, an attribute may be identified as part of the search query, and used to select from multiple candidates concepts identified for the referring expression. In particular, if only one of the candidate concepts include that identified attribute, that concept may be selected for the search query.

The identified concept is used to generate a search results page, as shown at block 808. For instance, the concept may be employed to select an instant answer that is provided on the search results page in addition to web document search results identified from the search index. The search results page is provided for presentation to the end user at block 808.

In some embodiments, a disambiguation page may be provided to an end user in response to a search query to allow the end user to manually select for one of several concepts identified for a search query. In particular, after the search query is received at block 802, several concepts may be identified for the referring expression at block 806. The search results page generated at block 808 may include a disambiguation list that lists the several concepts identified for the search query. When the disambiguation page is provided to the end user at block 810, the end user may select a concept, and the selected concept may be identified to the search engine, which may employ the selected concept to generate a new search results page that is provided to the end user.

As can be understood, embodiments of the present invention provide for identifying referring expressions that refer to concepts. The referring expressions may be employed for understanding the concepts to which search queries are directed. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by a computing device, cause the computing device to perform a method comprising:
identifying a first concept from an ontology of concepts;
identifying a first document corresponding with the first concept;
analyzing search query information to identify search queries that resulted in user selections of the first document;
identifying a plurality of referring expressions that refer to the first concept based on the search queries that resulted in the user selections of the first document, wherein the plurality of referring expressions that refer to the first concept are identified by:
generating a plurality of candidate expressions for the first concept,
identifying each search query that resulted in the user selections of the first document as corresponding with one candidate expression of the candidate expressions,
generating a score for each candidate expression of the candidate expressions based on the number of search queries that resulted in the user selections of the first document and identified as corresponding with said each candidate expression, wherein the generating the score for said each candidate expression includes applying weighting to the user selections of the first document based on one or more end user activities selected from following: dwell time on the first document corresponding with a user selection, whether an end user returns back to a search results page and selects other documents after viewing the first document following the user selection, whether a search session ends after the user selection of the first document, and whether an end user initiates a new search after selecting the first document, and
identifying said each candidate expression of the candidate expressions as a referring expression based on the scores generated for said each candidate expression of the candidate expressions.

2. The one or more computer storage media of claim 1, wherein the ontology of concepts is manually generated.

3. The one or more computer storage media of claim 1, wherein the ontology of concepts is automatically derived from an existing collection of documents, and wherein the first document is from the existing collection of documents.

4. The one or more computer storage media of claim 1, wherein at least one additional document is identified as corresponding with the first concept.

5. The one or more computer storage media of claim 1, wherein the candidate expressions are algorithmically generated based on text from the first document.

6. The one or more computer storage media of claim 1, wherein the candidate expressions are derived from the search queries that resulted in user selections of the first document.

7. The one or more computer storage media of claim 1, wherein the method further comprises:
receiving a search query from an end user;
determining that the search query corresponds with a first referring expression from the plurality of referring expressions;
identifying that the first concept is associated with the first referring expression;
generating a search results page using the first concept; and
providing the search results page for presentation to the end user.

8. The one or more computer storage media of claim 1, wherein the method further comprises:
determining that a first referring expression from the plurality of referring expressions corresponds with a second concept in addition to the first concept; and
disambiguating the first referring expression to determine that the first referring expression refers to the first concept.

9. The one or more computer storage media of claim 8, wherein disambiguating the first referring expression to determine that the first referring expression refers to the first concept comprises determining that search queries corresponding with the first referring expression resulted in more user selections in the first document corresponding with the first concept than a second document corresponding with the second concept.

10. The one or more computer storage media of claim 8, wherein disambiguating the first referring expression to determine that the first referring expression refers to the first concept comprises:
generating a first concept signature for the first concept and a second concept signature for the second concept;
performing a search using a search query corresponding with the referring expression;
obtaining a set of search results;
generating a search results signature from the set of search results;
comparing the search results signature to the first concept signature and the second concept signature;
selecting the first concept based on comparison of the search results signature to the first concept signature and the second concept signature.

11. A computer-implemented method for identifying referring expressions that refer to a concept, the method comprising:
identifying a first concept from an ontology of concepts;
identifying a first document corresponding with the first concept;
generating a plurality of candidate expressions for the first concept;
analyzing search query information to identify search queries that resulted in user selections of the first document;
mapping at least a portion of the search queries that resulted in a user selection of the first document to one candidate expression of the plurality of candidate expressions;
generating a score for each candidate expression based on the number of search queries that resulted in the user selection of the first document that map to said each candidate expression, wherein the generating the score for said each candidate expression includes applying weighting to the user selections of the first document based on one or more end user activities selected from following: dwell time on the first document corresponding with the user selection, whether an end user returns back to a search results page and selects other documents after viewing the first document following the user selection, whether a search session ends after the user selection of the first document, and whether an end user enters a refined search query after selecting the first document;

selecting referring expressions for the concept based on the score associated with said each candidate expression;

receiving a search query from the end user;

determining that the search query corresponds with a first referring expression from the referring expressions for the concept;

determining that the search query corresponds with the first concept based on determining that the search query corresponds with the first referring expression;

generating a search results page using the first concept; and providing the search results page for presentation to the end user in response to the search query.

12. The method of claim 11, wherein the ontology of concepts is automatically derived from an existing collection of documents, and wherein the first document is from the existing collection of documents.

13. The method of claim 11, wherein at least one additional document is identified as corresponding with the first concept.

14. The method of claim 11, wherein the candidate expressions are algorithmically generated based on text from the first document.

15. The method of claim 11, wherein the candidate expressions are derived from the search queries that resulted in user selections of the first document.

16. The method of claim 11, wherein the method further comprises:
   determining that the first referring expression corresponds with a second concept in addition to the first concept; and
   disambiguating the first referring expression to determine that the first referring expression refers to the first concept.

17. A system including at least one processor and at least one computer storage medium storing a plurality of components comprising:
   a monitoring component that monitors search queries and user search result selections of documents corresponding with concepts from an ontology of concepts;
   an expression identification component that identifies referring expressions for each concept from the ontology of concepts based on search queries that resulted in user search result selections of at least one document corresponding with each concept, wherein the expression identification component identifies referring expressions for a first concept from the ontology of concepts by:
      identifying a first document corresponding with the first concept;
      analyzing search query information to identify search queries that resulted in user selections of the first document;
      identifying a plurality of referring expressions that refer to the first concept based on the search queries that resulted in the user selections of the first document, wherein the plurality of referring expressions that refer to the first concept are identified by:
         generating a plurality of candidate expressions for the first concept,
         identifying each search query that resulted in the user selections of the first document as corresponding with one candidate expression of the candidate expressions,
         generating a score for each candidate expression based on the number of search queries that resulted in the user selections of the first document and identified as corresponding with said each candidate expression, wherein the generating the score for said each candidate expression includes applying weighting to the user selections of the first document based on one or more end user activities selected from following: dwell time on the first document corresponding with a user selection, whether an end user returns back to a search results page and selects other documents after viewing the first document following the user selection, whether a search session ends after the user selection of the first document, and whether an end user initiates a new search after selecting the first document, and
         identifying said each candidate expression of the candidate expressions as a referring expression based on the scores generated for said each candidate expression of the candidate expressions;
   a query concept component that operates to identify referring expressions corresponding with search terms of the search queries, and also identifies concepts corresponding with the referring expressions; and
   a user interface component that provides search results pages generated based on concepts identified for the search queries.

* * * * *

UNITED STATES PATENT AND TRADEMARK OFFICE
CERTIFICATE OF CORRECTION

PATENT NO. : 8,332,426 B2  
APPLICATION NO. : 12/953166  
DATED : December 11, 2012  
INVENTOR(S) : David Ahn et al.

Page 1 of 1

It is certified that error appears in the above-identified patent and that said Letters Patent is hereby corrected as shown below:

Title page, Item (54), Title should read as follows:

"IDENTIFYING REFERRING EXPRESSIONS FOR CONCEPTS"

Signed and Sealed this
Twelfth Day of March, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,332,426 B2
APPLICATION NO. : 12/953166
DATED : December 11, 2012
INVENTOR(S) : David Ahn et al.

It is certified that error appears in the above-identified patent and that said Letters Patent is hereby corrected as shown below:

Title page, Item (54) and at Column 1, lines 1 and 2, Title should read as follows:

"IDENTIFYING REFERRING EXPRESSIONS FOR CONCEPTS"

This certificate supersedes the Certificate of Correction issued March 12, 2013.

Signed and Sealed this
Ninth Day of April, 2013

Teresa Stanek Rea
*Acting Director of the United States Patent and Trademark Office*